United States Patent Office  3,426,128
Patented Feb. 4, 1969

3,426,128
Δ$^{1,4}$-16α-METHYL STEROIDS
Klaus Kieslich and Ulrich Kerb, Berlin-Charlottenburg, and Gerhard Raspe, Berlin-Zehlendorf, Germany, assignors to Schering A.G., Berlin, Germany
No Drawing. Continuation-in-part of application Ser. No. 323,062, Nov. 12, 1963. This application Oct. 23, 1965, Ser. No. 504,233
Claims priority, application Germany, Feb. 22, 1961, Sch 29,274; July 27, 1963, Sch 33,627
The portion of the term of the patent subsequent to Jan. 31, 1983, has been disclaimed
U.S. Cl. 424—243           24 Claims
Int. Cl. A61k 17/06; C07c 169/36

ABSTRACT OF THE DISCLOSURE

A compound of the formula:

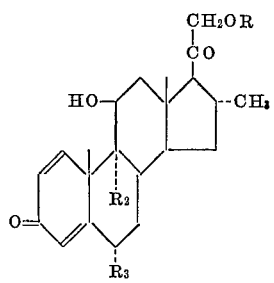

wherein R is acyl derived from a member selected from the group consisting of branched chain aliphatic carboxylic acids having at least four carbon atoms and straight chain aliphatic carboxylic acids having at least 6 carbon atoms in the acyl radical, R$_2$ is selected from the group consisting of hydrogen and halogen and R$_3$ is selected from the group consisting of hydrogen, halogen and methyl.
An example of the compounds of the invention is the following:
16α - methyl - 6α - fluor - 9α - chloro - Δ$^{1,4}$ - pregnadiene-11β,21-diol-3,20-dione-21-trimethylacetate.

---

The present invention relates to new Δ$^{1,4}$-16α-methyl steroids and to anti-inflammatory compositions utilizing such steroids as anti-inflammatory agent.
This application is a continuation in part of application Ser. No. 323,062, filed Nov. 12, 1963, now Patent 3,232,-839, which is in turn a continuation in part of application Ser. No. 172,124, filed Feb. 9, 1962, and now abandoned.
It is a primary object of the present invention to provide new Δ$^{1,4}$-16α-methyl steroids of the above type.
It is a further object of the present invention to provide new Δ$^{1,4}$-16α-methyl steroids which are useful as intermediates in the production of compounds of the steroids series, as for example 16α-methyl-Δ$^{1,4}$-6-pregnatriene-11β-21-diol-3,20-dione-21-acetate; 6,16α-dimethyl-9 - bromo - Δ$^{1,4}$ - pregnadiene - 11β,21 - diol - 3,20 - dione-21-acetate; 6,16α - dimethyl-Δ$^{1,4}$-pregnatriene-11β,21-diol-3,20-dione-21-acetate; 6α-halogen-16α-methyl-Δ$^{1,4}$-pregdiene-11β,21-diol-3,20-dione-21-pyranyl ether; 6α-methyl-16α - methyl - Δ$^{1,4}$ - pregnadiene - 11β,21 - diol - 3,20-dione-21-pyranyl ether; 6α-halogen-16α,21-dimethyl-Δ$^{1,4}$-pregnadiene-11β,21-diol-3,20-dione; and 6α,16α,21-trimethyl-Δ$^{1,4}$-pregnadiene-11β,21-diol-3,20-dione, and also to methods of producing such Δ$^{1,4}$-16α-methyl steroids. The compounds of the present invention can be used as intermediates in the production of the aforesaid compounds by for example hydrogenating one or more of the bonds.
In addition, and this is a further object of the present invention, the compounds of the present invention have useful therapeutic properties by themselves, particularly as anti-inflammatory agents. In fact, the compounds of the present invention are not only generally useful as anti-inflammatory agents, but these compounds, and particularly certain specific compounds among the new compounds produced according to the present invention, as will be more fully set forth below constitute highly superior anti-inflammatory agents.
Other objects and advantages of the present invention will be apparent from a further reading of the specification and of the appended claims.
With the above and other objects in view, the present invention mainly comprises as the new compounds useful as intermediates and as anti-inflammatory agents, compounds of the formula:

(I)

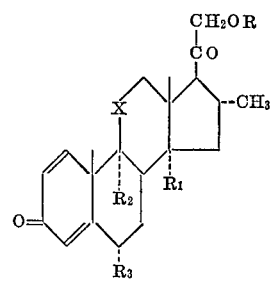

wherein R is selected from the group consisting of hydrogen and acyl, wherein acyl is preferably derived from an aliphatic carboxylic acid i.e., a branched chain aliphatic carboxylic acid or a straight chain aliphatic carboxylic acid having at least 4 carbon atoms in the alkyl group thereof, wherein R$_1$ is selected from the group consisting of hydrogen and hydroxyl, R$_1$ being hydroxyl only when X is —CH$_2$—, wherein X is selected from the group consisting of —CO—, —CHOH— and —CH$_2$—, wherein R$_2$ is selected from the group consisting of hydrogen and halogen, and wherein R$_3$ is selected from the group consisting of halogen and methyl when R$_1$ is other than hydroxyl, and when R$_1$ is hydroxy then R$_3$ is selected from the group consisting of hydrogen, methyl and halogen.
The substituents R$_2$ and R$_3$ may be any of the halogens, i.e. iodine, bromine, chlorine or fluorine, and when R$_2$ and R$_3$ are both halogen, they may be the same halogen or different halogens. It is most preferred that R$_2$ and R$_3$ be either chlorine or fluorine, the most preferred compounds being those wherein R$_2$ and/or R$_3$ are fluorine.
The compounds of the present invention may be produced according to different reaction mechanisms. According to one method, a compound of the formula:

(II)

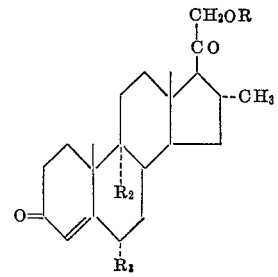

wherein R, R$_2$ and R$_3$ have the same definitions as above, is subjected to the biochemical introduction of an oxygen function on the 11-carbon atom or the 14-carbon atom, i.e. to hydroxylation of the 11-carbon atom or the 14-carbon atom by biochemical methods. The thus formed 11-position introduced hydroxyl group can, if desired, be converted in known manner by oxidation to the oxo group. The resulting compound is then converted into the corresponding $\Delta^{1,4}$-steroid by treatment with dehydrogenating microorganisms or by known chemical dehydrogenation agents, and, in the event that the 21-position is an hydroxyl group, the same can then, if desired, by selective acylation of the 21-position hydroxyl group be converted into the corresponding acylated compound.

The biochemical hydroxylation of the starting material can be carried out, for example, with *Curvularia lunata,* Mutant NRRL 2380.

The hydroxyl group introduced at the 11-position carbon atom can either be an α-oriented or β-oriented hydroxyl group. The hydroxyl group in the 11-position, either α-oriented or β-oriented, can be further oxidized by means of oxidation agents normally used for this purpose, for example N-bromacetamide.

As 1,2-position dehydrogenating microorganism it is possible to use, for example, *Bacillus lentus,* Mutant MB 284, or *Corynebacterium simplex,* Mutant ATCC 6946.

For acylation of the 21-hydroxyl group, the most preferred acid is acetic acid, and other preferred acids are other lower aliphatic carboxylic acids such as propionic acid, butyric acid, caproic acid, enantic acid, undecylic acid, palmitic acid, phenyl propionic acid, pivalinic acid, tert. butylacetic acid, isobutyric acid, diethylacetic acid, dimethyl butyric acid, etc., or their reactable acid derivatives may be used in the reactions.

It is clear that the above method requires, in the case where both $R_2$ and $R_3$ are halogen, such as fluorine, and wherein X carries an oxygen function, for example in the production of compounds of the following formula:

(III)

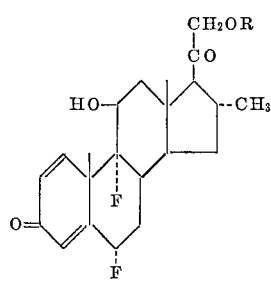

the use as starting material of a $\Delta^4$-compound without the oxygen function in 11-position, but with the halogen atoms in 6-position and in 9-position, for example a starting compound of the following formula:

(IV)

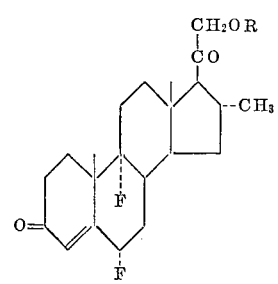

which compound is hydroxylated at the 11-carbon atom by biochemical means, dehyrated in 1-position by dehydrogenating microorganisms, or by chemical dehydrogenating agents, and, if desired, selectively acylating the 21-position hydroxyl group in the case wherein R is hydrogen.

It has further been found that compounds of the above type wherein both $R_2$ and $R_3$ are halogen, for example compounds of the Formula III above, can be produced from starting materials which do not contain a 9α-position halogen, e.g. fluorine atom, for example starting from compounds of the following formula:

(V)

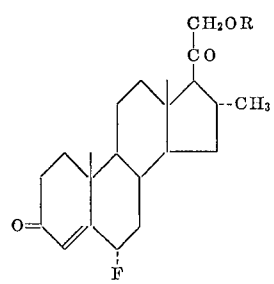

and after hydroxylating the same in 11-position converting the 11-position hydroxyl group into the 9α-fluoro-11 β-hydroxy grouping to obtain the final desired 11-hydroxylated compound.

This method has the advantage that it makes no difference whether the primary 11-hydroxylation results in an 11α-hydroxyl group or an 11β-hydroxyl group.

This method is illustrated by the following series of formulas, in which the method steps from the starting compound of Formula V to the respective 11-hydroxylated product is omitted in order to give a clearer picture.

Method 1:

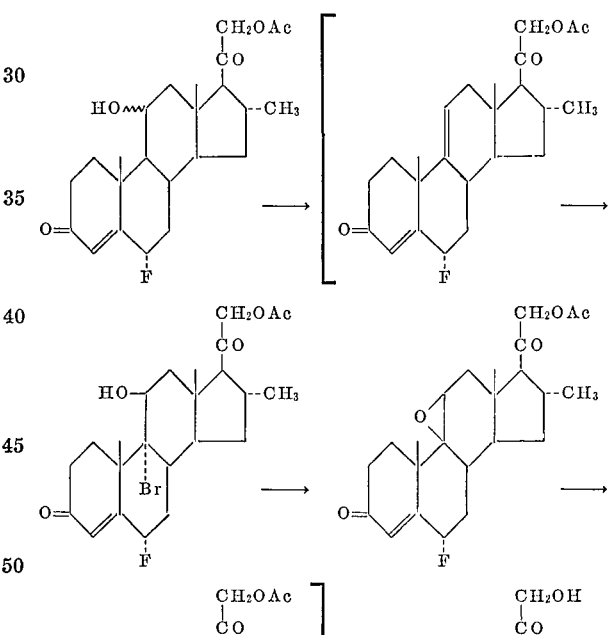

Method 2:

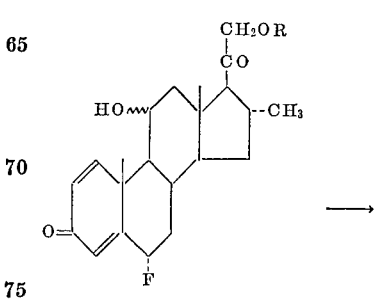

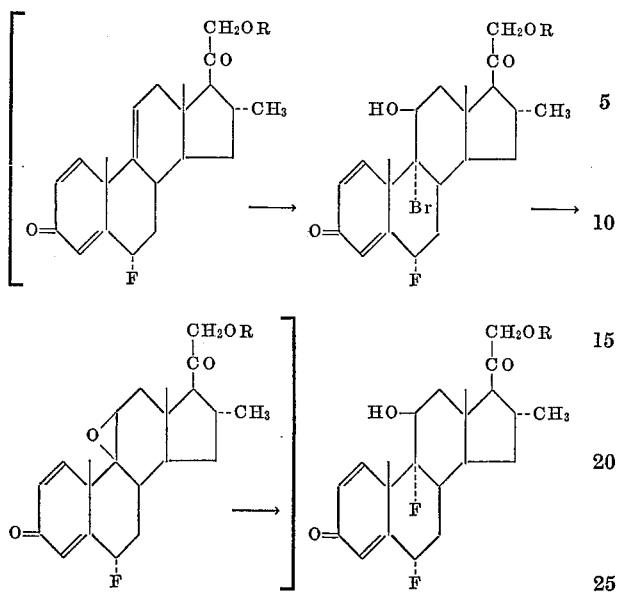

The new compounds of the present invention possess marked therapeutic activity in the treatment of inflammatory diseases.

The compounds of the present invention have remarkably little side reactions, for example with respect to influence of the mineral balance, despite the mineralocorticoid type of structure of the compounds.

This is illustrated by the following table wherein WD 50 ("active dose 50") is the dose of the tested substance which, according to A. Robert and J. E. Nezamis (Acta Endrocrinologica, vol. 25 (1957), page 105), gives an attenuation of the exudate formation of 50% compared to the untreated controls, and wherein "Doc" represents desoxycorticosterone:

TABLE 1

|  | Granuloma test WD 50 in mg. | | Percent of action on the Na/K Quotient, which is exerted by 10 γ Doc. at a dosage which corresponds to the WD 50 in the Granuloma Test |
|---|---|---|---|
|  | Local | P.O. |  |
| Hydrocortisone acetate | | 0.055 | 3.8 | 45 |
| Dexamethasone | 0.0065 | 0.08 | 70 |
| Fluorhydrocortisone acetate | 0.01 | 0.14 | 145 |
| 16α-methyl-1,4-pregnadiene-11 β, 21-diol-3,20-dione | 0.01 | 0.24 | 30 |
| 6α-Fluor-16α-methyl-1,4-pregnadiene-11 β, α-21-diol-3,20-dione | 0.01 | 0.02 | |

The anti-inflammatory action of the compounds of the present invention is particularly marked upon peroral administration, as shown in Table 2 below in which the action of 16α-methyl-6α,9α-difluoro-1-dehydrocorticosterone (I) is compared with 6α,9α-difluoro-1-dehydrocorticosterone (II) and 16α-methyl-9α-fluoroprednisolone (III). The anti-inflammatory action was determined on male rats weighing about 150 g. each. After oral administration of the active ingredient in the form of a gum arabic-suspension by means of the known granuloma pouch test. The obtained value was compared in relation to hydrocortisone acetate (IV) which was used as the standard substance and was given an anti-inflammatory action equal to 1.

TABLE

| Active Substance | Arrestation of inflammation | Glycogen action | | Catabolic action | | Adrenal Inhibiting Activity | |
|---|---|---|---|---|---|---|---|
|  |  | Compared to IV | Activity Quotient | Compared to IV | Activity Quotient | Compared to IV | Activity Quotient |
| I | 1,300×IV | 30×IV | 0.023 | 110×IV | 0.083 | 200×IV | 0.154 |
| II | 3.8×IV | 6×IV | 1.6 | 5×IV | 1.3 | 40×IV | 10.5 |
| III | 380×IV | 30×IV | 0.079 | 80×IV | 0.21 | 100×IV | 0.416 |

The value of an active substance is arrived at not only by determining the superior absolute values of the desired action, for example the anti-inflammatory action, but it is also determined in general by the extent of the undesired side effects of a substance, it being well known that with a produced increase in activity in a series there is also obtained a corresponding increase in the side effects.

In the instant case it was therefore quite surprising that the significant increase of the anti-inflammatory action of the compound I, namely 16α-methyl-6α,9α-difluoro-1-dehydrocorticosterone is accompanied by only a slight increase in the undesired glycogen, catabolic and adrenal inhibition side effects (compare columns B, C and F of Table 2).

The glyconeogenetic action was determined on mice using the customary liver glycogen test. The catabolic and adrenal inhibiting actions were tested on growing female rats weighing about 40–50 g. over a 14-day period following subcutaneous administration of the test substance. The applied dosage to determine the degree of side effect was so chosen that with compounds I, II and III the same anti-inflammatory action was obtained. Hydrocortisone acetate again served as the standard substance for this test. The values, particularly the surprisingly low corresponding activity quotients prove that the compound of the present invention, compound I, as compared to the comparison substances II and III, with regard to the undesired side effects exhibits markedly superior properties.

Because of the exceedingly low side effects, particularly on the glycogen balance, the catabolic effect and the adrenal inhibiting effect, the compounds of the present invention are not only suitable for the treatment of external inflammatory diseases, such as skin diseases of all types, but are also suitable for the treatment of internal inflammatory diseases, such as kidney inflammation, liver inflammation, polyarthritis, and the like diseases, by oral administration.

The anti-inflammatory action of the compounds of the present invention is further illustrated in Table 3 below in which compounds of the present invention were compared in the granuloma pouch test to hydrocortisone acetate (V), which was given the anti-inflammatory activity of 1, after oral administration of the tested compounds. The values are set forth in the table:

TABLE 3

P.o.

16α-methyl-6α-fluoro-9α-chloro-$\Delta^{1,4}$-pregnadiene-11β,21-diol-3,20-dione (V) _____ 100 —300 x VI
16α-methyl-6α-fluoro-9α-chloro-$\Delta^{1,4}$-pregnadiene-11β,21-diol-3,20-dione-21-acetate (VI) _____ 130 x IV
16α-methyl-9α-chloro-$\Delta^{1,4}$-pregnadiene-11β,21-diol-3,20-dione (VII) _____ 100 —130 x IV
16α-methyl-9α-chloro-$\Delta^{1,4}$-pregnadiene-11β,21-diol-3,20-dione-21-acetate (VIII) _____ 38 x IV The compound 6α-fluoro-16α-methyl-$\Delta^{1,4}$-pregnadiene-11β,21-diol-3,20-dione (IX) was also compared to 6α-fluoro-$\Delta^{1,4}$-pregnadiene-11β,21-diol-3,20-dione (X) with respect to the desired anti-inflammatory action, as well as with respect to the undesired glycogen and catabolic side effects. The values are set forth in Table 4 below in which the compounds tested were compared with hydrocortisone acetate (IV), which was given an anti-inflammatory action of 1.

TABLE 4

| Substance | Arrestation of inflammation P.O. | Glycogen Action | | Catabolic Action | |
|---|---|---|---|---|---|
| | | In comparison to IV | Activity Quotient | In comparison to IV | Activity Quotient |
| IX | 200×IV | 2.5×IV | $\frac{1}{80}=0.0125$ | 10.0×IV | $\frac{1}{20}=0.05$ |
| X | 0.4×IV | 2×IV | $\frac{1}{0.2}=5$ | 1.25×IV | $\frac{1}{0.32}=3.13$ |

The anti-inflammatory action of the compounds of the application were observed in comparison to that of hydrocortisone acetate and 16α-methyl-6α-fluor-1,4-pregnadiene-11β,21-diol-3,20-dione-acetate with respect to their effect on experimentally induced arthritis in the rat paw.

The anti-inflammatory activity was determined in 80–100 g. male rats. Each rat was first subjected to a volumetive type of measurement of his right paw (control value). Edema was induced by injection of heat killed and freeze-dried *Mycobacterium butyricum* (0.05 ml. of a 0.5% suspension in paraffin oil). After 24 hours the same paw was again measured and then the test substance in the amounts indicated (in the form of their solution in castor oil) injected intramuscularly and the paw measured daily for size change.

The following compounds of Table 5 are quoted as an illustration for the inflammatory action of the compounds of the application.

TABLE 5

| | | Dosis, mg./kg. | Duration of Activity in Days |
|---|---|---|---|
| I | Hydrocortisonelacetate | 100 | 15 |
| II | 16α-methyl-6α-fluor-1,4-pregnadiene-11β,21-diol-3,20-dione-21-acetate. | 10 | 18 |
| III | 16α-methyl-6α-fluor-1,4-pregnadiene-11β,21-diol-3,20-dione-21-caproate. | 10 | 36 |
| IV | 16α-methyl-6α-fluor-1,4-pregnadiene-11β,21-diol-3,20-dione-21-enanthate. | 10 | 49 |

TABLE 5—Continued

| | | Dosis, mg./kg. | Duration of Activity in Days |
|---|---|---|---|
| V | 16α-methyl-6α-fluor-1,4-pregnadiene-11β,21-diol-3,20-dione-21-undecylate. | 10 | 65 |
| VI | 16α-methyl-6α-fluor-1,4-pregnadiene-11β,21-diol-3,20-dione-21-palmitate. | 100 | >80 |
| VII | 16α-methyl-6α-fluor-1,4-pregnadiene-11β,21-diol-3,20-dione-21-trimethyl-acetate. | 10 | 27 |
| VIII | 16α-methyl-6α-fluor-9α-chloro-1,4-pregnadiene-11β,21-diol-3,20-dione-21-butyrate. | 1 | 21 |
| IX | 16α-methyl-6α-fluor-9α-chloro-1,4-pregnadiene-11β,21-diol-3,20-dione-21-caproate. | 1 | 28 |
| X | 16α-methyl-6α-fluor-9α-chloro-1,4-pregnadiene-11β,21-diol-3,20-dione-21-undecylate. | 1 | 60 |
| XI | 16α-methyl-6α-fluor-9α-chloro-1,4-pregnadiene-11β,21-diol-3,20-dione-21-triUethylacetate. | 1 | 27 |
| XII | 16α-methyl-6α,9α-difluor-1,4-pregnadiene-11β,21-diol-3,20-dione-21-caproate. | 1 | 16 |
| XIII | 16α-methyl-6α,9α-difluor-1,4-pregnadiene-11β,21-diol-3,20-dione-21-enanthate. | 1 | 21 |
| XIV | 16α-methyl-6α,9α-difluor-1,4-pregnadiene-11β,21-diol-3,20-dione-21-undecylate. | 1 | 36 |
| XV | 16α-methyl-6α,9α-difluor-1,4-pregnadiene-11β,21-diol-3,20-dione-21-trimethylacetate. | 1 | 16 |

The anti-inflammatory action of the compounds of the invention was determined in healthy human subjects 18–38 years of age in the following manner:

The backs of the test subjects were prepared in a manner so as to produce a specific design using therefor a 2 cm. broad strip of Tesafilm. The design as it appeared on the back included areas of stripped and normal skin—i.e., areas of irritation corresponding to the design pattern. Thereafter each of the test substances in salve form containing a specified concentration of active substance was applied onto the back of the subject, an area of 4 cm.$^2$ being covered. Over this 4 cm.$^2$ area the same amount of salve—namely, about 25 mg. of the salve containing the designated concentration—was applied.

The vasoconstriction as well as the other anti-inflammatory actions were then measured. This included the degree of activity and the duration of activity. To this end the backs of the test subjects were photographed using Kodak color film and the color value of the portion of the back which had been treated so as to have imparted thereto a design photographed both before and after treatment with the salve. The untreated or normal skin was given a color value of 100, and the stripped skin a color value of 0.

Following application of the salve, the anti-inflammatory activity was measured by comparing newly determined color values with the color values previously obtained. The activity—i.e., recognizable or unquestionable anti-inflammatory activity—which was produced by the minimum concentration of active agent was noted. In addition, the time in which the desired activity was attained following application of the salve to the skin was also recorded. Further, the time taken to obtain a color value of 50 in the stripped skin was also noted (this value will be set out later in the table in the column WD.) The results of the tests are set out in the following table. As a standard hydrocortisone was employed.

TABLE

| Substance | Concentration of active agent in weight percent | Onset of activity (time elapsed in hours) | WD$_{50}$ |
|---|---|---|---|
| Hydrocortisone | 0.1 | 3 | 5½ |
|  | 0.01 | 3½ | 5½ |
| 16α-methyl-6α-fluor-Δ$^{1,4}$-pregnadiene-11β,21-diol-3,20-dione-21-butyrate. | 0.001 | 2 | 3½ |
|  | 0.0001 | 1 | 3 |
| 16α-methyl-6α-fluor-Δ$^{1,4}$-pregnadiene-11β,21-diol-3,20-dione-21-trimethylacetate. | 0.001 | 1 | 2 |
|  | 0.0001 | 2 | 3½ |
| 16α-methyl-6α-fluor-Δ$^{1,4}$-pregnadiene-11β,21-diol-3,20-dione-21-phenylpropionate. | 0.1 | 1 | 2½ |
|  | 0.01 | 1 | 2½ |
| 16α-methyl-6α-fluor-Δ$^{1,4}$-pregnadiene-11β,21-diol-3,20-dione-21-onanthate. | 0.01 | 1½ | 4 |
|  | 0.01 | 2 | 4 |
| 16α-methyl-6α-fluor-Δ$^{1,4}$-pregnadiene-11β,21-diol-3,20-dione-21-capronate. | 0.1 | 3 | 4½ |
|  | 0.01 | 3 | 4½ |
| 16α-methyl-6α-fluor-9α-chlor-Δ$^{1,4}$-pregnadiene-11β,21-diol-3,20-dione-21-trimethylacetate. | 0.001 | 1 | 2 |
|  | 0.0001 | 1 | 2½ |

From the above table it is clearly apparent that the compounds in accordance with the invention have an onset of activity and a WD$_{50}$ significantly superior to that of hydrocortisone. Further the compounds in accordance with the invention in most instances show these properties at minimal concentrations (significantly less than that required to produce the noted effect with hydrocortisone).

For medical purposes the compounds of the present invention can be used in all common administration forms, for example as lotions, salves, powders or tinctures for external application, or as tablets, powders, suspensions, capsules and as injectible preparations for internal administration. The medicinal preparations are produced in known methods by working up of the active agent with the common pharmaceutical carriers.

The following examples are given to further illustrate the present invention. The scope of the invention is not, however, meant to be limited to the specific details of the examples.

EXAMPLE I (a) Production of 16α-methyl-4-pregnene-11β,21-diol-3,20-dione (=16α-methylcorticosterone)

A fermenter of rust-free steel having a 50-liter capacity is charged with 30 liters of a nutrient solution containing:

4.4% glucose (starch sugar)
1.0% malt extract
0.3% NaNO$_3$
0.1% KH$_2$PO$_4$
0.05% KCl
0.05% MgSO$_4$
0.002% FeSO$_4$
0.5% corn steep sterilized for one half hour at 120° C. and after cooling, inoculated with a spore suspension of *Curvularia lunata* which is obtained by rinsing a seven day corn culture (15 g. corn) with approximately 100 cc. of physiological sodium chloride solution.

After two days of culturing at 25° C. under stirring (220 revolutions per minute) and ventilating (1.65 m.$^3$/hour), 1.8 liters of the obtained culture are removed under sterile conditions and introduced into a fermenter of the same size charged with 28.2 liters of a nutrient solution containing:

4.4% glucose (starch sugar)
1.0% malt extract
0.3% NaNO$_3$
0.1% KH$_2$PO$_4$

After 24 hours cultivation under stirring and ventilation as described above, 7.5 g. of 16α-methyl-desoxycorticosterone obtained by saponification of the corresponding 21-acetate and melting at 102–104° C. in 200 cc. of ethanol are added and fermented under the same conditions for 28 hours.

The course of the fermentation is tested by removal of samples, which are extracted with methyl isobutyl ketone. The extract is analyzed by paper chromatography in a system of dioxane+toluene/propylene glycol.

After the end of fermentation (28 hours) the culture broth is filtered off by suction over a large suction filter. The mycelium residue is washed with water several times. The filtrate is extracted three times, each time with 10 liters of methyl isobutyl ketone. The extract is concentrated under vacuum in a circulating evaporator and in a round flask carefully dried under vacuum. The residue is crystallized from acetone/isopropyl ether. The melting point is 157–158° C. (fermentation yield=60%).

The pure product yield obtained after a second crystallization and chromatography of the mother liquor on silica gel amounts to 53% of the theoretical.

*Analysis.*—Calculated for C$_{22}$H$_{32}$O$_4$ (360.5), e$_{240}$=15,400: C, 73.3; H, 9.0; O, 17.7. Found: C, 73.1; H, 9.2; O, 17.2.

(b) Production of 16α-methyl-1,4-pregnadiene-11β,21-diol-3,20-dione (=16α-methyl-1-dehydro-corticosterone)

A fermenter made of rust-free steel and having a 50-liter capacity is charged with 30 liters of a nutrient solution containing 1% glucose and 0.2% corn steep and sterilized as described in Example I(a) above. It is then inoculated with a bacterial suspension of *Corynebacterium simplex*, which is obtained by rinsing a bouillon agar surface plate of 64 cm.$^2$ with 7 cc. of physiological sodium chloride solution.

After 24 hours of culturing under the conditions of Example I(a) above, 1.8 liters of the obtained culture are removed under sterile conditions and transferred into a fermenter containing 28.2 liters of the same medium. At the same time there is added a solution of 7.5 g. of 16-methyl-corticosterone of Example I(a) in 150 cc. of ethanol and the same is fermented under the same conditions for 16 hours at 25° C.

The course of fermentation (14 hours) is again tested by removal of samples which are extracted with methyl isobutyl ketone. The extracts are analyzed by polarographic methods.

The cultured broth, without filtration, is extracted three times, each time with 10 liters of methyl isobutyl ketone. The extract is worked up as described under I(a) above. The residue, after recrystallization two times from acetone/isopropyl ether results in 4.5 g. of a crystalline product melting at 191/192–193.5° C.

By chromatography of the mother liquor an additional 2 g. is obtained. The total yield amounts to 87% of the theoretical.

*Analysis.*—Calculated for C$_{22}$H$_{30}$O$_4$ (358.48), $\gamma_{242}$=15,100: C, 73.75; H, 8.4; O, 17.85. Found: C, 73.7; H, 8.9; O, 18.0.

(c) Production of 16α-methyl-1,4-pregnadiene-11β,21-diol-3,20-dione-21-acetate (=16α-methyl-1-dehydro-corticosterone-21-acetate)

500 mg. of 16 α-methyl-1-dehydro-corticosterone obtained from Example I(b) above are allowed to stand in 3 cc. of pyridine with 1.5 cc. of acetanhydride for two hours at room temperature and thereafter 20 cc. of 8% sulfuric acid are introduced at 0° C. After one hour the crystalline product is filtered off under suction, washed with water and dried. There is obtained 558 mg. of a crude product which is recrystallized from a small amount of ethanol. The final yield is 492 mg. of the compound which melts at 204–205° C. The yield corresponds to 87% of the theoretical.

*Analysis.*—Calculated for $C_{24}H_{32}O_5$ (400.5), $\epsilon_{242}=15,020$: C, 72.0; H, 8.1; O, 19.95. Found: C, 71.7; H, 8.4; O, 20.4.

EXAMPLE II (a) Production of 16α-methyl-Δ⁴-pregnene-21-ol-3,11,20-trione 2 g. of 16α-methylcorticosterone obtained according to Example I(a) are dissolved in 120 cc. of 96% acetone, mixed with 1.4 g. of N-bromacetamide are allowed to stand for three hours at room temperature. 600 cc. of water are stirred in and the reaction mixture is then extracted four times, each time with 11 cc. of methylene chloride. The extract is washed until neutral, dried over sodium sulfate and concentrated under vacuum. The residue (2.1 g.) is subjected to chromatography over silica gel. 1.4 g. of the crude 11-keto compound are eluated with $CH_2Cl_2:CHCl_3$ (1:1) and $CHCl_3$. There is obtained after recrystallization from chloroform-isopropyl ether 900 mg. of the product melting at 176/179–181° C. The yield amounts to 44% of the theoretical.

*Analysis.*—Calculated for $C_{22}H_{30}O_4$ (385.5), $\epsilon_{237}=15,120$: C, 73.7; H, 8.4; O, 17.9. Found: C, 71.7; H, 8.5; O, 17.6.

(b) Production of 16α-methyl-Δ¹,⁴-pregnadiene-21-ol-3,11,20-trione from 16α-methyl-Δ⁴-pregnene-21-ol-3,11,20-trione 16α-methyl-Δ⁴-pregnene - 21 - ol - 3,11,20 - trione, produced according to Example II(a), are dehydrogenated by means of *Corynebacterium simplex* as described in Example I(b) to obtain 16α-methyl-Δ¹,⁴-pregnadiene-21-ol-3,11,20-trione, which is identical with the product produced acording to Example II(c), below.

(c) Production of 16α - methyl-Δ¹,⁴-pregnadiene-21-ol-3,11,20-trione from 16α-methyl - Δ¹,⁴ - pregnadiene-11β,21-diol-3,20-dione 1 g. of 16α - methyl - Δ¹ - dehydro - corticosterone (see Example II(a) are oxidized and further worked up as described in Example I(b) with 60 cc. of 96% acetone and with 720 mg. of N-bromacetamide for 3 hours. There is thus obtained 1.2 g. of the crude product, which after chromatographic purification on silica gel and recrystallization from ethyl acetate-hexane yields 430 mg. (43% of the theoretical) of the pure 11-keto compound which melts at 160/161–163° C.

*Analysis.*—Calculated for $C_{22}H_{28}O_4$ (356.46), $\epsilon_{237}=15,120$: C, 74.2; H, 7.9; O, 17.9. Found: C, 73.5; H, 8.2, O, 17.8.

(d) Production of 16α-methyl-Δ¹,⁴-pregnadiene-21-ol-3,11,20-trione-21-acetate 550 mg. of 16α-methyl-Δ¹-dehydrocorticosterone-21-acetate obtained from Example I(c) are dissolved in 92 cc. of 96% acetone, oxidized by means of 1.1 g. of N-bromacetamide for three hours at room temperature as described in Example II(a), and then further worked up. There is thus obtained 550 mg. of the crude product which is subjected to chromatography on silica gel. The methylene chloride eluate contains 390 mg. of the crystalline substance, which after recrystallization from a small amount of ethanol results in 286 mg. of the pure product which melts at 207/209–210° C.

*Analysis.*—Calculated for $C_{24}H_{30}O_5$ (398.5), $\epsilon_{237}=14,820$: C, 72.3; H, 7.6; O, 20.1. Found: C, 71.6; H, 7.9; O, 20.1.

EXAMPLE III (a) Production of 16α-methyl-Δ⁴-pregnene-14α,21-diol-3,20-dione

A fermenter of rust-free steel having a 50 liter capacity is charged with 30 liters of a nutrient solution containing:

5% saccharose
1% beet sugar molasses
0.2% $NaHCO_3$
0.1% $KH_2PO_4$
0.05% KCl
0.001% $FeSO_4$
0.05% $MgSO_4$
0.5% corn steep (pH 7)

heated for one half hour at 120° C. to sterilize it and after cooling is innoculated with a spore suspension of *Curvularia lunata* which is obtained by rinsing a seven day corn culture (15 g. corn) with approximately 100 cc. of physiological sodium chloride solution.

After two days of growth at 25° C. under stirring (220 revolutions per minute) and ventilation (1.65 m.³/hour), 1.8 liters of the obtained culture are removed under sterile conditions and introduced into a 50 liter fermenter containing 30 liters of a nutrient solution containing:

5% saccharose
1% beet sugar molasses
0.2% $NaNO_3$
0.1% $KH_2PO_4$

After 24 hours of growth under stirring (110 revolutions per minute) and ventilation (8 m.³/hour), 7.5 g. of 16α-methyl-Δ⁴-pregnene-21-ol-3,20-dione in 200 cc. of ethanol are added and the fermentation is continued for 28 hours under the same conditions.

The course of fermentation is tested by the removal of samples, which are extracted with methyl isobutyl ketone. The extracts are subjected to paper chromatography in a system of dioxane+toluene/propylene glycol for analysis.

After the end of the fermentation the culture broth is filtered off under suction and extracted with methyl isobutyl ketone. The extract is concentrated under vacuum and the residue is subjected to chromatography on silica gel to separate the 11β- and the 14α-hydroxylated compounds. The fractions with 16α-methyl-Δ⁴-pregnene-14α,21-diol-3,20-dione are acetylated as the crude product, as follows:

6 g. of the crude product in 20 cc. of pyridine with 10 cc. of acetanhydride are allowed to stand for 3 hours at room temperature and then 120 cc. of 8% sulfuric acid at 0° C. are stirred in. After 1 hour the crystalline product is filtered off under suction, washed with water, dried, and then recrystallized from isopropyl ether. 1.7 g. of the compound is obtained, the compound melting at 192/193–194° C.

*Analysis.*—Calculated for $C_{24}H_{34}O_5$ (402.5), $\epsilon_{240}=15,200$: C, 71.7; H, 8.5; O, 19.9. Found: C, 70.4; H, 9.0; O, 20.1.

(b) Production of 16α-methyl-Δ¹,⁴-pregnadiene-14α,21-diol-3,20-dione

16α-methyl-Δ⁴-pregnene-14α,21-diol - 3,20 - dione are dehydrogenated with *Corynebacterium simplex* as described in Example I(b), thereby obtaining 16α-methyl-Δ¹,⁴-pregnadiene-14α,21-diol-3,20-dione.

EXAMPLE IV (a) Production of 16α-methyl-6α-chloro-Δ⁴-pregnene-11β,21-diol-3,20-dione 16α-methyl-6α-chloro-Δ⁴-pregnene-21-ol-3,20-dione are, analogously to Example I(a), hydroxylated in 11β-position. The hitherto unknown starting material 16α-methyl-6α-chloro-Δ⁴-pregnene-21-ol-3,20-diose (melting point= 171–173° C.), and its 21-acetate (melting point 144–145.5° C.) is obtained from 16α-methyl-Δ⁵-pregnene-3β- ol-20-one-acetate by addition of chlorine onto the 5–6 double bond, saponfication of the 3-acetoxy group, bromination of the 21-position methyl, reaction of the introduced 21-bromine atom with potassium acetate, oxidation of the 3-position hydroxyl to the keto group, subsequently splitting off of hydrogen chloride, and if desired saponfication of the 21-acetoxy group.

(b) Production of 16α-methyl-6α-chloro-Δ$^{1,4}$-pregnadiene-11β,21-diol-3,20-dione 16α - methyl - 6α - chloro - Δ$^4$ - pregnene - 11β,21 - diol-3,20-dione is dehydrogenated with Corynebacterium simplex as described in Example I(b), and there is thus obtained 16α-methyl-6α-chloro-Δ$^{1,4}$-pregnadiene-11β,21-diol-3,20-dione.

EXAMPLE V (a) 16α-methyl-6α-fluoro-Δ$^4$-pregnese-11β,21-diol-3,20-dione

16α - methyl - 6α - fluoro - Δ$^4$ - pregnene - 21 - ol - 3,20-dione-21-acetate (M.P.: 132/134–138° C., UV$\epsilon_{238}$=15,000) is hydroxylated with Curvularia lunata in 11β-position using the fermentation method previously described in Example I(a), whereby the 21-acetate group is simultaneously saponified. The hitherto unknown starting material 16α-methyl-6α-fluoro-Δ$^4$-pregnene-21-ol-3,20-dione-21-acetate is obtained from 16α-methyl-Δ$^5$-pregnene-3β,21-diol-20-one-21-acetate (M.P. 152–154° C.) by the addition of bromo-fluorine (from N-bromacetamide and hydrogen fluoride) onto the 5–6 double bond, oxidation of the 3β-hydroxyl group with chromic acid, introduction of the Δ$^4$-double bond by splitting of the hydrogen bromide and acid isomerization of the 6β-fluoro substituent to the 16α-methyl-6α-fluoro-Δ$^4$-pregnene-21-ol-3,20-dione-21-acetate.

By chromatographic purification on silica gel the 16α - methyl - 6α - fluoro - Δ$^4$ - pregnene - 11β,21 - diol-3,20-dione is: M.P. 166/167–171° C.; $\epsilon_{236}$=14,000.

(b) 16α-methyl-6α-fluoro-Δ$^4$-pregnene-11β,21-diol-3,20-dione-21-acetate

By reaction of the compound of Example V(a) with acetanhydride in pyridine at room temperature as described in Example I(c), the acetate is obtained and recrystallized from ethyl acetate. M.P. 248/249–251° C.; $\epsilon_{236}$=14,000.

(c) 16α-methyl-6α-fluoro-Δ$^{1,4}$-pregnadiene-11β,21-diol-3,20-dione

16α - methyl - 6α - fluoro - Δ$^4$ - pregnene - 11β,21 - diol-3,20-dione is dehydrogenated with Corynebacterium simplex as described in Example I(b). The extraction residue is subjected to chromatography on silica gel and after recrystallization there is obtained from a methylene chloride-isopropyl ether 16α - methyl - 6α - fluoro - Δ$^{1,4}$ - pregnadiene-11β,21-diol-3,20-dione. M.P. 180/181–182° C.; $\epsilon_{241}$=15,320.

(d) 16α-methyl-6α-fluoro-Δ$^{1,4}$-pregnadiene-11β,21-diol-3,20-dione-21-acetate 16α - methyl - 6α - fluoro - Δ$^{1,4}$ - pregnadiene - 11β,21-diol-3,20-dione are acetylated as described in Example I(c) above and the product is recrystallized from methylene chloride/isopropyl ether. M.P. 232/233–235° C.; $\epsilon_{240}$=15,360.

(a) 16α-methyl-6α-fluoro-Δ$^4$-pregnene-14α,21-diol-3,20-dione

The mother liquor of Example V(a) upon additional chromatography permits the isolation of 16α-methyl-Δ$^4$-pregnene-14α,21-diol-3,20-dione. After recrystallization from ethyl acetate: M.P. 250/252–253° C.; $\epsilon_{235}$=14,000.

(b) 16α-methyl-6α-fluoro-Δ$^4$-pregnene-14α,21-diol-3,20-dione-21-acetate

16α - methyl - 6α - fluoro - Δ$^4$ - pregnene - 14α,21 - diol-3,20-dione are acetylated as described in Example I(c) above, and recrystallized from ethanol/isopropyl ether. M.P. 179/180–182° C.; $\epsilon_{236}$=14,400.

(c) 16α-methyl-6α-fluoro-Δ$^{1,4}$-pregnadiene-14α,21-diol-3,20-dione

16α - methyl - 6α - fluoro - Δ$^4$ - pregnene - 14α,21 - diol-3,20-dione are dehydrogenated with Corynebacterium simplex as described in Example I(b). The extraction residue is subjected to chromatography on silica gel and after recrystallization from ethyl acetate there is obtained 16α - methyl - 6α - fluoro - Δ$^{1,4}$ - pregnadiene - 14α,21-diol-3,20-dione. M.P. 241/242–243° C.; $\epsilon_{242}$=16,500.

(d) 16α-methyl-6α-fluoro-Δ$^{1,4}$-pregnadiene-14α,21-diol-3,20-dione-21-acetate 16α - methyl - 6α - fluoro - Δ$^{1,4}$ - pregnadiene - 14α,21-diol-3,20-dione are acetylated as described in Example I(c) and recrystallized from ethyl acetate. M.P. 220/223–236° C.; $\epsilon_{241}$=15,500.

EXAMPLE VII (a) 16α-methyl-Δ$^{1,4}$-pregnadiene-14α,21-diol-3,20-dione

Analogously to Example I(b) 30 liters of a sterile nutrient solution containing 0.1% yeast extract, 0.5% corn steep and 0.2% glucose are innoculated with a bacterial suspension of Bacillus lentus Mutant MB 284. After 24 hours of culturing, 1.8 liters of the culture broth are transferred into 28.2 liters of a sterile medium of the same composition. At the same time, 7.5 g. of 16α-methyl-Δ$^4$-pregnene-14α,21-diol-3,20-dione in 150 cc. of ethanol are added and the fermentation is continued for 30 hours at 25° C. The culture broth is further worked up as described in Example I(b), whereby there is obtained 5.2 g. of crystalline crude product which is recrystallized from ethyl acetate. The yield is 3.7 g., and the compound melts at 242/244–246° C.

Analysis.—Calculated for $C_{22}H_{30}O_4$ (358.5), $\epsilon_{243}$=15,750: C, 73.8; H, 8.4; O, 17.8. Found: C, 73.6; H, 8.5; O, 18.5.

(b) 16α-methyl-Δ$^{1,4}$-pregnadiene-14α,21-diol-3,20-dione-21-acetate 320 mg. of 16α-methyl-Δ$^{1,4}$-pregnadiene-14α,21-diol-3,20-dione are acetylated in 3 cc. of pyridine with 1.5 cc. of acetic acid anhydride for 2 hours at room temperature, as described in Example I(c), and then further worked up. The crude product is recrystallized from ethyl acetate. The compound melts at 208/209–210° C.

Analysis.—Calculated for $C_{24}H_{32}O_5$ (400.52), $\epsilon_{245}$=15,830: C, 72.1; H, 8.6; O, 19.84. Found: C, 71.96; H, 9.97; O, 19.95.

EXAMPLE VIII (a) 16α-methyl-9α-fluoro-Δ$^4$-pregnene-11β,21-diol-3,20-dione

As described in Example I(a), 7.5 g. of 16α-methyl-9α-fluoro - Δ$^4$ - pregnene-21-ol-3,20-dione-21-acetate, obtained from 16α-methyl-Δ$^4$-pregnene-11β-21-diol-3,20-dione (see Example I(a)) by acetylating with acetic anhydride in pyridine followed by reaction of the thus formed 21-acetate (melting at 193.5–194.5° C.) with hydrogen fluoride in pyridine at 0° are fermented for 36 hours with Curvularia lunata (Mutant NRRL 2380), whereby the 21-acetate group is simultaneously saponified and the broth is further worked up. The residue is extracted with methyl isobutyl ketone, subjected to chromatography on silica gel and there is obtained from chloroform/ethyl acetate (2:1) an eluate containing the 11β-hydroxyl compound, which is further dehydrogenated as the crude product.

(b) 16α-methyl-9α-fluoro-Δ$^{1,4}$-pregnadiene-11β,21-diol-3,20-dione

16α-methyl - 9α - fluoro-Δ$^4$-pregnene-11β,21-diol-3,20-dione obtained as the crude product under Example VIII(a) above, is fermented with Bacillus lentus for 30 hours and further worked up, as described in Example VII(a). The residue is extracted with methyl isobutyl ketone and there is obtained as the crude product 16α-methyl-9α-fluoro-Δ$^{1,4}$-pregnadiene - 11β,21 - diol - 3,20-dione.

(c) 16α-methyl-9α-fluoro-Δ$^{1,4}$-pregnadiene-11β,21-diol-3,20-dione-21-acetate 16α-methyl - 9α - fluoro-Δ$^{1,4}$-pregnadiene-11β,21-diol-3,20-dione are acetylated as described in Example I(c) as the crude product, and further worked up. The obtained crude acetate is recrystallized from isopropyl ether/methyl chloride. The melting point=220–226° C.

UV: $\epsilon_{239}$=15,600

EXAMPLE IX (a) 6α,16α-dimethyl-Δ$^4$-pregnene-11β,21-diol-3,20-dione

As described in Example I(a) 6α,16α-dimethyl-Δ$^4$-pregnene-21-ol-3,20-dione-21-acetate (M.P. 120–121° C.) is fermented with Curvularia lunata in 11β-position, whereby the 21-acetate group is simultaneously saponified. The hitherto unknown starting material 6β,16α-dimethyl-Δ$^4$-pregnene-21-ol-3,20-dione-21-acetate is obtained from 6β,16α-dimethyl-pregnane-3β,5α-diol - 20 - one (R. P. Graber Chem. and Ind., 1960, 1478) by treatment with bromine in ether, reaction of the introduced 21-bromine atom with potassium acetate, oxidation of the 3β-position hydroxyl with chromic acid, introduction of the Δ$^4$-double bond by dehydration with hydrogen chloride in acetic acid whereby the 6β-methyl group is simultaneously isomerized.

By chromatography on silica gel the 6α-16α-dimethyl-Δ$^4$-pregnene-11β,21-diol-3,20-dione is isolated. M.P. 165–167.5° C.

(b) 6α,16α-dimethyl-Δ$^4$-pregnene-11β,21-diol-3,20-dione-21-acetate

By reaction with acetanhydride in pyridine at room temperature as described in Example I(c) the acetate is obtained. M.P. 194–195.5° C.

(c) 6α,16α-dimethyl-Δ$^{1,4}$-pregnadiene-11β,21-diol-3,20-dione

6α,16α-dimethyl - Δ$^4$ - pregnene-11β,21-diol-3,20-dione is dehydrogenated with Corynebacterium simplex as described in Example I(b).

(d) 6α,16α-dimethyl-Δ$^{1,4}$-pregnadiene-11β,21-diol-3,20-dione-21-acetate

6α,16α-dimethyl - Δ$^{1,4}$ - pregnadiene-11β,21-diol-3,20-dione is acetylated as described in Example I(c).

EXAMPLE X.—Reaction method 1 illustrated above (a) Production of 6α-fluoro-16α-methyl-4,9(11)-pregnadiene-21-ol-3,20-dione-21-acetate 10 g. of 6α-fluoro-16α-methyl-Δ$^4$-pregnene-11β,21-diol-3,20-dione-21-acetate are dissolved in 8.8 cc. of pyridine and 50 cc. of dimethylformamide and warmed under nitrogen to a temperature of +70° C. 4.42 cc. of methyl chloride are then added and the temperature is maintained at 80–85° C. for 30 minutes. After cooling to 20° C. the solution is stirred into 900 cc. of ice water. The precipitate is filtered off under suction and dried. The crude product amounts to 9.25 g. (97.5% of the theoretical). The melting point is 160/164–167° C. $\alpha_D$+112.3° CHCl$_3$;

$\epsilon_{234}$=15,100

(b) Production of 6α-fluoro-9α-bromo-16α-methyl-Δ$^4$-pregnene-11β,21-diol-3,20-dione 21-acetate A solution of 6.02 g. of dibromodimethylhydantoin in 10 cc. of distilled water and 25.4 cc. of dioxane is added at 20° C. to a solution of 10 g. of 6α-fluoro-16α-methyl-4,9(11)-pregnadiene-21-ol-3,20-dione-21-acetate in 125 cc. of dioxane, and then the mixture is stirred for an additional 10 minutes. A solution of 0.845 cc. of perchloric acid in 13.4 cc. of distilled water is then added and in time intervals of 15 minutes each, 2 cc. of the reaction mixture each time is titrated with ⅒ N Na$_2$S$_2$O$_3$ solution against starch. The reaction (60–75 minutes) is ended when no more HOBr is needed. 3.77 g. of sodium acetate 3H$_2$O and 2.42 g. of sodium sulfite in 25 cc. of water are added for neutralization, whereby the temperature is maintained at a maximum of 23° C. After the neutralization, the test with potassium iodide starch paper should give a negative result and the pH value is between 5.6 and 7. 150 cc. of methanol is then added. The inorganic precipitate is filtered off under suction and the filter residue subsequently washed with a mixture of 26.8 cc. of methanol:dioxane (1:1). 442 cc. of distilled water is added under stirring to the filtrate at +15° C. The precipitate is stirred for two hours at +5° C. and the precipitated substance then filtered off under suction and dried at 20° C. under vacuum over KOH. The yield is 10.8 g. (86.5% of the theoretical) of the crude product. The melting point is 162–164° C. (with decomposition).

(c) Production of 6α-fluoro-16α-methyl-9β,11β-oxido-Δ$^4$-pregnene-21-ol-3,20-dione-21-acetate 10 g. of 6α-fluoro-9α-bromo-16α-methyl-Δ$^4$-pregnene-11β,21-diol-3,20-dione-21-acetate are added at 50° C. to a solution of 8.7 g. of potassium acetate in 104 cc. of ethyl alcohol and the reaction mixture is cooked under refluxing for 75 minutes. After cooling to +10° C., 247 cc. of water are added dropwise in such manner that the temperature of the reaction solution does not increase to above +15° C. The reaction mixture is subsequently further stirred for 2 hours under ice cooling and filtered off under suction. The crude product is recrystallized from methanol with the addition of carbon. The yield is 7.32 g. (88% of the theoretical). The melting point is 153/154.5–156° C. $\epsilon_{237}$=13,000; $\alpha_D$+72.1° (CHCl$_3$).

(d) Production of 6α a,9α-difluoro-16α-methyl-Δ$^4$-pregnene-11β,21-diol-3,20-dione-21-acetate 8 cc. of hydrogen fluoride are added at 0° C. to a mixture of 90 cc. of chloroform and 10 cc. of ethanol, and subsequently during a time period of 15 minutes a solution of 10 g. of 6α - fluoro-16α-methyl-9β,11β-oxido-Δ$^4$-pregnene-21-ol-3,20-dione-21-acetate in 90 cc. of chloroform are added. The reaction mixture is then further stirred for 2 hours at 0 to 5° C. For neutralization there is added at a maximum temperature of 45° C., 30.75 g. of potassium carbonate dissolved in 30 cc. of water. After the addition of a 5% sodium bicarbonate solution, the neutralization is completed to a pH value of 6.5. The chloroform solution is again washed with water, dried and concentrated to dryness under vacuum. The residue is recrystallized first from methanol-chloroform with the addition of carbon and subsequently from chloroform-benzene. The yield is 5.0 g. (47% of the theoretical). The melting point is 229/232–234° C. $\alpha_D$+133.8° CHCl$_3$; $\epsilon_{233}$=16,000.

(e) Production of 6α,9α-difluoro-16α-methyl-Δ$^{1,4}$-pregnadiene-11β,21-diol-3,20-dione 16α - methyl - 6α,9α-difluoro-Δ$^4$-pregnene-11β,21-diol-3,20-dione-21-acetate (melting point=229/232–234° C. (with decomposition)) is dehydrogenated in 1,2-position by means of Bacillus lentus, Mutant MB 284, whereby the 21-acetate group is simultaneously saponified. (It is possible under the same conditions to start with the free 21-hydroxyl compound.)

17

For this purpose a fermenter made of stainless steel having a 50 liter capacity is charged with 30 liters of a nutrient solution of 0.1% yeast extract, 0.5% cornsteep and 0.2% glucose, heated for one half hour at 120° C. for sterilization purposes, and after cooling, inoculated with a bacterial suspension of Bacillus lentus MB 284.

After 24 hours of growth at 28° C. under stirring (220 revolutions per minute) and aeration (1.65 m.³/hour), 1.8 liters of the obtained culture is removed under sterile conditions and transferred with 28 liters of the same sterilized nutrient medium into a fermenter of the same size.

Simultaneously, 6 g. of 16α-methyl-6α,9α-difluoro-Δ⁴-pregnene-11β,21-diol-3,20-dione-21-acetate in 200 cc. of dimethylformamide are added and the fermentation is continued for 50 hours under the same conditions.

The course of the fermentation is tested by removal of samples which are extracted with methyl isobutyl ketone. The extracts are analyzed by thin layer chromatography using a system of benzene/ethyl acetate (4:1).

After further working up analogously to Example I there is obtained an oily crystalline residue which is subjected to chromatography on silica gel. The 16α-methyl-6α,9α - difluoro-Δ¹,⁴-pregnadiene-11β,21-diol-3,20-dione is eluated with ethyl acetate-chloroform (1:2), it is recrystallized from ethyl acetate/ether and then formed to melt at 240/242–244° C. The yield is 60% of the theoretical. $\epsilon_{237}=16{,}600$.

EXAMPLE XI.—The reaction mechanism of method 2 illustrated above (a) Production of 6α-fluoro-16α-methyl-Δ¹,⁴,⁹⁽¹¹⁾-pregnatriene-21-ol-3,20-dione-21-acetate 10 g. of 6α-fluoro-16α-methyl-Δ¹,⁴-pregnadiene-11β,21-diol-3,20-dione-acetate are dehydrated as described in Example X(a). The compound melts at 164–165° C. (from methanol). $\epsilon_{238}=16{,}750$.

(b) Production of 6α-fluoro-9α-bromo-16α-methyl-Δ¹,⁴-pregnadiene-11β,21-diol-3,20-dione-21 acetate 10 g. of 6α-fluoro-16α-methyl-Δ¹,⁴,⁹⁽¹¹⁾-pregnatriene-21-ol-3,20-dione-21-acetate are converted to the corresponding bromohydrin as described in Example X(b). The crude product melts at 120–126° C. (with decomposition).

(c) Production of 6α-fluoro-16α-methyl-9β,11β- oxido-Δ¹,⁴-pregnadiene-21-ol-3,20-dione-21-acetate 10 g. of 6α - fluoro-9α-bromo-16α-methyl-Δ¹,⁴-pregnadiene-11β,21-diol-3,20-dione-21-acetate are converted into the corresponding 9,11β-epoxide as described in Example X(c). The crude product melts at 145–149° C. $\epsilon_{239}=14{,}300$.

(d) Production of 6α,9α-difluoro-16α-methyl-Δ¹,⁴-pregnadiene-11β,21-diol-3,20-dione-21-acetate 10 g. of 6α - fluoro - 16α-methyl-9β,11β-oxido-Δ¹,⁴-pregnadiene - 21-ol-3,20-dione-21-acetate are treated with hydrogen fluoride as described in Example X(d). The crude product is recrystallized from ethyl acetate. The melting point is 259/260–261.5° C. $\epsilon_{237}=16{,}400$.

EXAMPLE XII (METHOD 1)

(a) Production of 6α-fluoro-16α-methyl-Δ⁴-pregnene-11β,21-diol-3,20-dione

A fermenter made of stainless steel and having a 50 liter capacity is charged with 30 liters of a nutrient solution of:

4.4% glucose (starch sugar)
1% cornsteep liquor
0.3% NaNO₃
0.1% KH₂PO₄ and heated for one half hour at 120° C. for sterilization, and after cooling inoculated with a Spore suspension of Aspergillus ochraceus, which is obtained by rinsing a 7-day

18 corn cob culture (15 g. corn) with about 100 cc. of physiological sodium chloride solution.

After 1-day growth at 30° C. under stirring (220 revolutions per minute) and aeration (1.65 m.³/hour), 1.8 liters of the obtained culture is removed under sterile conditions and transferred into a fermenter of the same size with 28.2 liters of a nutrient solution of 1% glucose and 1% soy flour. At the same time, 7.5 g. of 6α-fluoro-16α-methyl-Δ⁴-pregnene-21-ol-3,20-dione dissolved in 100 cc. of ethanol are added and fermented under the same conditions for about 48 hours.

The course of the fermentation is determined by removal of samples which are extracted with methyl isobutyl ketone. The extracts are analyzed by thin layer chromatography.

After the end of the fermentation the material is further worked up as described in Example I(a). The crude product can be recrystallized from ethyl acetate without chromatography. The melting point is 178.5–179.5° C. $\epsilon_{237}=14{,}800$.

(b) Production of 6α-fluoro-16α-methyl-Δ⁴-pregnene-11α,21-diol-3,20-dione-21-acetate 10 g. of 6α-fluoro-16α-methyl-Δ⁴-pregnene-11α,21-diol-3,20-dione are dissolved in 20 cc. of dimethyl formamide and under stirring mixed with 600 mg. of

$$Pb(CH_3COO)_2 \cdot 3 \cdot H_2O$$

and 8 cc. of acetanhydride. After subsequent stirring for an additional 2 hours at room temperature the reaction solution is poured into water. The resulting precipitate is filtered off under suction, dried and recrystallized from ethyl acetate-isopropyl ether. The melting point is 169.5–170° C. $\epsilon_{237}=14{,}900$.

(c) Production of 6α-fluoro-16α-methyl-4,9(11)-pregnadiene-21-ol-3,20-dione-21-acetate 4.22 g. of bromacetamide are added to a solution of 10 g. of 6α-fluoro-16α-methyl-Δ⁴-pregnene-11α-21-diol-3,20-dione-21-acetate in 100 cc. of pyridine at 20° C. and subsequently stirred for an additional 10 minutes. After cooling to +5° C., SO₂ gas is conducted into the solution at this temperature until, upon testing of the reaction mixture with potassium iodide starch paper a negative result is obtained. During the gas introduction a substance precipitates in the reaction mixture. It forms into a thick crystalline broth. To complete the precipitation, 200 cc. of water and −10° C. are added after completion of the gas introduction. The precipitate is filtered off under suction after several hours of standing washed with dilute pyridine-free hydrochloric acid and washed with water until neutral. The crude produce is recrystallized from methylene chloride-ethyl acetate. The melting point is 160/165–168° C. $\epsilon_{234}=15{,}200$.

The further working up proceeds as described in Examples X(b)–X(e).

EXAMPLE XIII (METHOD 2)

(a) Production of 6α-fluoro-16α-methyl-Δ¹,⁴-pregnadiene-11α,21-diol-3,20-dione 7.5 g. of 6α - fluoro - 16α - methyl-Δ⁴-pregnene-11α,21-diol-3,20-dione are fermented with Bacillus lentus as described in Example X(c). The crude product can be recrystallized without chromatography from ethyl acetate-isopropyl ether. The melting point is 255/257–260° C. $\epsilon_{237}=16{,}200$.

(b) Production of 6α-fluoro-16α-methyl-Δ¹,⁴-pregnadiene-11α,21-diol-3,20-dione-21-acetate 10 g. of 6α-fluoro-16α-methyl-Δ¹,⁴-pregnadiene-11α,21-diol-3,20-dione are selectively acetylated in 21-position as described in Example XII(b). The melting point is 230/233–235° C. $\epsilon_{237}=15{,}800$.

(c) Production of 6α-fluoro-16α-methyl-Δ$^{1,4,9(11)}$-pregnatriene-21-ol-3,20-dione-21-acetate 10 g. of 6α-fluoro-16α-methyl-Δ$^{1,4}$-pregnadiene-11α,21-diol-3,20-dione are dehydrated as described in Example XII(c). The melting point is 164–165° C. (from methanol). $\epsilon_{238}$=16,750.

The further working up proceeds as described in Examples XI(c)–XI(d).

EXAMPLE XIV (a) Production of 16α-methyl-6α-fluoro-9α-chloro-Δ$^{1,4}$-pregnadiene-11β,21-diol-3,20-dione-21-acetate 1 g. of 16α-methyl-6α-fluoro-Δ$^{1,4,9(11)}$-pregnatriene-21-ol-3,20-dione-21-acetate (produced as described in Example XI(a)) are dissolved in 52.4 cc. of dioxane, mixed with 3.53 g. of N-chlorosuccinimide and 26.3 cc. of 1 N perchloric acid and stirred for 6 hours at 25° C. under argon. The solution is poured into ice water containing sodium thiosulfate, stirred for 1 hour and the precipitated substance is filtered off under suction, washed until neutral, dried and recrystallized from methanol/methylene chloride. The melting point is 252° C. (with decomposition). The yield is 0.79 g. UV $\epsilon_{237}$=16,100.

(b) Production of 16α-methyl-6α-fluoro-9α-chloro-Δ$^{1,4}$-pregnadiene-11β,21-diol-3,20-dione 400 mg. of 16α-methyl-6α-fluoro-9α-chloro-Δ$^{1,4}$-pregnadiene-11β,21-diol-3,20-dione-21-acetate are suspended in 1.6 cc. of methylene chloride and 1.6 cc. of methanol and mixed at 0–5° C. under argon with a solution of 24 mg. of potassium hydroxide in 0.8 cc. of methanol. The reaction mixture is stirred for 80 minutes at 0–5° C., neutralized with several drops of glacial acetic acid, diluted with methylene chloride, washed with water until neutral and evaporated. The residue is recrystallized from methanol-methylene chloride. The melting point is 254° C. (with decomposition). The yield is 265 mg. UV $\epsilon_{237}$=16,200.

EXAMPLE XV (a) Production of 16α-methyl-9α-chloro-Δ$^{1,4}$-pregnadiene-11β,21-diol-3,20-dione-21-acetate 11.6 g. of 16α-methyl-Δ$^{1,4}$-pregnadiene-11β,21-diol-3,20-dione-21-acetate are dissolved in 50 cc. of dimethyl formamide and 11 cc. of pyridine, mixed with 5.1 cc. of methane sulfochloride and stirred for 1 hour at 80° C. After cooling to 20° C., the solution is stirred into ice water, the precipitate filtered off under suction, dried and recrystallized from acetone/hexane. The obtained 16α-methyl - Δ$^{1,4,9(11)}$-pregnatriene-21-ol-3,20-dione-21-acetate melts at 157–158° C. The yield amounts to 80% of the theoretical.

(b) Production of 16α-methyl-9α-chloro-Δ$^{1,4}$-pregnadiene-11β-21-diol-3,20-dione-21-acetate 3 g. of 16α - methyl - Δ$^{1,4,9(11)}$-pregnatriene-21-ol-3,20-dione-21-acetate are dissolved in 157 cc. of dioxane, mixed with 10.6 g. of N-chlorosuccinimide and 79 cc. of 1 N perchloric acid and stirred at 30° C. for 6 hours under argon. The solution is stirred into ice water containing sodium thiosulfate, the precipitate filtered off under suction, dried and recrystallized from isopropyl ether/methylene chloride. The obtained 16α-methyl-9α-chloro-Δ$^{1,4}$ - pregnadiene-11β,21-diol-3,20-dione-21-acetate melts at 215° C. (with decomposition). The yield amounts to 65% of the theoretical. UV $\epsilon_{238}$=15,500.

(c) Production of 16α-methyl-9α-chloro-Δ$^{1,4}$-pregnadiene-11β,21-diol-3,20-dione 800 mg. of 16α-methyl-6α-chloro-Δ$^{1,4}$-pregnadiene-11β, 21-diol-3,20-dione-21-acetate are saponified as described in Example X(b) and further worked up. The residue is recrystallized from methanol-methylene chloride. The melting point is 234° C. (with decomposition). The yield amounts to 60% of the theoretical. UV $\epsilon_{238}$=15,300.

EXAMPLE XVI

16α-methyl-6α-fluor-Δ$^{1,4}$-pregnadiene-11β, 21-diol-3,20-dione-21-enanthate 2 g. 16α - methyl-6α-fluor-Δ$^{1,4}$-pregnadiene-11β,21-diol-3,20-dione in 8 ml. pyridine and 4 ml. enanthate acid anhydride were allowed to stand at room temperature for 16 hours. The enanthate which crystallized out was separated by suction filtering and after drying, the enanthate was recrystallized from a mixture of methylene chloride and isopropylether. Melting point 226–227° C. UV: $\epsilon_{242}$=16,200. The yield amounted to 80% of theory.

EXAMPLE XVII

16α-methyl-6α-fluor-Δ$^{1,4}$-pregnadiene-11β, 21-diol-3,20-dione-21-trimethylacetate 2 g. 16α - methyl-6α-fluor-Δ$^{1,4}$-pregnadiene-11β,21-diol-3,20-dione in 20 ml. pyridine and 2.5 ml. pivalin acid chloride were stirred for 16 hours at 5° C. and then poured into ice water. The separated precipitate was taken up in acetic ester, washed with 1 N sulfuric acid, N/10 soda lye and water, evaporated and crystallized out of carbon tetrachloride. Melting point 171–173° C. UV: $\epsilon_{242}$=15,600. The yield amounted to 90% of theory.

EXAMPLE XVIII

16α-methyl-6α-fluor-Δ$^{1,4}$-pregnadiene-11β, 21-diol-3,20-dione-21-butyrate 2 g. of 16α - methyl-6α-fluor - Δ$^{1,4}$ - pregnadiene-11β,21-diol-3,20-dione in 8 ml. pyridine were reacted with 4 ml. butyric acid anhydride and the reaction mixture worked up as set out in Example XVI. The 16α-methyl-6α-fluor-Δ$^{1,4}$-pregnadiene - 11β,21 - diol - 3,20 - dione-21-butyrate thus obtained was crystallized out of a mixture of methylene chloride and isopropylether. Melting point 185–168° C. UV: $\epsilon_{246}$=16,300. The yield amounted to 85% of theory.

EXAMPLE XIX

16α-methyl-6α-fluor-Δ$^{1,4}$-pregnadiene-11β, 21-diol-3,20-dione-21-t.butylacetate 1 g. 16α-methyl-6α-fluor-Δ$^{1,4}$-pregnadiene-11β,21-diol-3,20-dione and 2 ml. t.butylacetyl chloride were stirred for 16 hours at −7° C. in 25 ml. pyridine. The reaction mixture was then worked up as set out in Example XVII. Following recrystallization from isopropylether/methylene chloride, 750 mg. 16α-methyl-6α-fluor-Δ$^{1,4}$-pregnadiene-11β,21-diol-3,20-dione-21t.butylacetate were obtained. Melting point 211–213° C. UV: $\epsilon_{241}$=15,850.

EXAMPLE XX

16α-methyl-6α-fluor-Δ$^{1,4}$-pregnadiene-11β, 21-diol-3,20-dione-21-phenylpropionate 3 g. 16α - methyl-6α-fluor-Δ$^{1,4}$-pregnadiene-11β,21-diol-3,20-dione were reacted with 6 ml. phenylpropionic acid chloride in 75 ml. pyridine at −4° C. The reaction mixture was stirred for a further 15 hours at −4° C. Then it was poured into ice water and extracted with methylene chloride. The methylene chloride solution was washed with dilute sulfuric acid, N/10 soda lye and water, dried and evaporated in vacuo. The resulting crude 16α-methyl-6α-fluor-Δ$^{1,4}$-pregnadiene-11β,21 - diol - 3,20 - dione - 21-phenylpropionate was chromatographed on silica gel and thereafter crystallized out of isopropylether/methylene chloride. Melting point 238–239° C. UV: $\epsilon_{208}$=14,300, $\epsilon_{241}$=16,600. The yield amounted to 75%.

EXAMPLE XXI

16α-methyl-6α-fluor-Δ$^{1,4}$-pregnadiene-11β, 21-diol-3,20-dione-21-undecylate 8 g. 16α - methyl-6α-fluor-Δ$^{1,4}$-pregnadiene-11β,21-diol-3,20-dione in 60 ml. pyridine and 13 g. undecylacidanhydride were allowed to stand for 48 hours at 20° C. The reaction mixture was worked up as described in Example XVII. The crude 16α-methyl-6α-fluor-Δ$^{1,4}$-pregnadiene-11β,21-diol-3,20-dione-21-undecylate was taken up in pentane and crystallized from isopropyl ether. Melting point 66–67° C. The yield amounted to 95% of theory.

EXAMPLE XXII

16α-methyl-6α-fluor-Δ$^{1,4}$-pregnadiene-11β, 21-diol-3,20-dione-21-palmitate 18 g. 16α-methyl-6α-fluor-Δ$^{1,4}$-pregnadiene-11β,21-diol-3,20-dione were stirred together with 1 ml. palmitic acid chloride in 20 ml. pyridine for 48 hours at 7° C. and the reaction mixture worked up as described in Example XVII. The obtained 16α-methyl-6α-fluor-Δ$^{1,4}$-pregnadiene-11β,21-diol-3,20-dione-21-palmitate was crystallized out of isopropyl ether. Melting point 93–94° C. The yield amounted to 80% of theory.

EXAMPLE XXIII

16α-methyl-6α-fluor-9α-chlor-Δ$^{1,4}$-pregnadiene-11β,21-diol-3,20-dione-21-undecylate 2 g. 16α - methyl-6α-fluor - 9α - chlor-Δ$^{1,4}$-pregnadiene-11β,21-diol-3,20-dione in 15 ml. pyridine were reacted with 3.2 g. undecylic acid anhydride and worked up as described in Example XXI. Melting point 140.5–141.5° C. The yield amounted to 90% of theory.

EXAMPLE XXIV

6α,9α-difluor-16α-methyl-1,4-pregnadiene-11β,21-diol-3,20-dione-21-enanthate 400 mg. 6α,9α-difluor-16α-methyl-1,4-pregnadiene-11β, 21-diol-3,20-dione were dissolved in 1.6 ml. pyridine and reacted with 0.8 ml. enanthic acid anhydride. The reaction mixture was permitted to stand for 24 hours at room temperature. The solution was then stirred at 0° C. with 20 ml. 8% sulfuric acid. The mixture which formed was then extracted with methylene chloride. The extract was then successively washed with water, NaCHO$_3$ solution and water, dried over Na$_2$SO$_4$ and evaporated to dryness in vacuo. The resulting residue was crystallized from acetone - isopropylether. Melting point 213–214° C. UV:ε$_{237}$=16,800. The yield amounted to 425 mg.

EXAMPLE XXV

16α-methyl-6α-fluor-9α-chlor-Δ$^{1,4}$-pregnadiene-11β,21-diol-3,20-dione-21-caproate (a) 10 g. 16α-methyl-6α-fluor-Δ$^{1,4}$-pregnadiene-11β,21-diol-3,20-dione-21-caproate (M.P. 242–245° C.) prepared from the 21-OH compound, by reaction with caproic acid anhydride/pyridine at room temperature; (yield 90%) were dissolved in 50 ml. dimethyl formamide and 8.8 ml. pyridine and thereafter reacted with 4.4 ml. methanesulfochloride as described in Example XV(a).

The obtained 16α - methyl - 6α - fluor-Δ$^{1,4,9(11)}$-pregnatriene-21-ol-3,20-dione-caproate was recrystallized from isopropylether/methylene chloride. Melting point 120–122° C. UV:ε$_{237}$=16,900. The yield amounted to 85% of theory.

(b) 7.8 g. 16α-methyl-6α-fluor-Δ$^{1,4,9(11)}$-pregnatriene-21-ol-3,20-dione-caproate were dissolved in 410 ml. dioxane and then reacted with 27.5 g. N-chlorosuccinimide and 205 ml. 1 N perchloric acid as described in Example XIV(b). The 16α - methyl-6α-fluor-9α-chlor-Δ$^{1,4}$-pregnadiene-11β,21-diol-3,20-dione-21-caproate was crystallized from isopropyl ether/methylene chloride. Melting point 154.5–155.5° C. UV:ε$_{242}$=16,000. The yield amounted to 60% of theory.

EXAMPLE XXVI

16α-methyl-6α-fluor-9α-chlor-Δ$^{1,4}$-pregnadiene-11β,21-diol-3,20-dione-21-t-butylacetate (a) 1 g. 16α-methyl-6α-fluor-Δ$^{1,4}$-pregnadiene-11β,21-diol-3,20-dione were dissolved in 25 ml. absolute pyridine under 1 cc. cooling reacted with 2 ml. t-butyl-acetylchloride (content of about 5% thionyl chloride) and allowed to stand for 16 hours at 20° C. Thereafter the reaction mixture was diluted with methylene chloride and successively washed with dilute sulfuric acid, water 1% NaHCO$_3$ solution and water. The methylene chloride solution was thereafter evaporated in vacuo and the resulting 16α-methyl - 6α - fluor - Δ$^{1,4,9(11)}$ - pregnatriene - 21 - ol - 3,20-dione - t - butylacetate crystallized from methylene chloride/isopropyl ether. Melting point 167–168° C. UV:ε$_{237}$=16,700. The yield amounted to 65% of theory.

(b) 800 mg. 16α-methyl-6α-fluor-Δ$^{1,4,9(11)}$-pregnatriene-21-ol-3,20-dione-t-butyl-acetate were dissolved in 42 ml. dioxane and reacted under stirring and at 30° C. with 2.8 g. N-chloronecinimide and 21 ml. 1 N-perchloric acid for 35 hours. The reaction mixture was worked up as described in Example XIV(a). The thus obtained 16α-methyl-6α-fluor-9α-chlor-Δ$^{1,4}$-pregnadiene-11β,21 - diol-3, 20-dione-21-butylacetate was crystallized from isopropyl ether/methylene chloride. Melting point 231.5–232° C. UV:ε$_{238}$=16,400. The yield amounted to 50% of theory.

EXAMPLE XXVII

16α-methyl-6α-fluor-9α-chlor-Δ$^{1,4}$-pregnadiene-11β,21-diol-3,20-dione-21-trimethylacetate (a) 3 g. 16α-methyl-6α-fluor-Δ$^{1,4}$-pregnadiene-11β,21-diol-3,20-dione were dissolved in 75 ml. dry pyridine and under ice cooling reacted with 6 ml. trimethyl-acetyl chloride and 0.06 ml. thionyl chloride. The reaction mixture was permitted to stand for 16 hours at room temperature. Thereafter the reaction solution was stirred into 1.5 liters of ice water, extracted with methylene chloride and the methylene chloride phase successively washed with dilute sulfuric acid (1+9), N/10 soda lye and water, dried and evaporated. The resulting crude 16α-methyl-6α-fluor-Δ$^{1,4,9(11)}$-pregnatriene-21-ol-3,20-dione - trimethyl - acetate was chromatographed over silica gel and crystallized from methylene chloride-isopropyl ether. Melting point 209–210° C. UV:ε$_{238}$=16,300. The yield amounted to 90–95% of theory.

(b) 4 g. 16α-methyl-6α-fluor-Δ$^{1,4,9(11)}$-pregnatriene-21-ol-3,20-dione-trimethyl-acetate were dissolved in 250 ml. dioxane and then reacted with 14 g. N-chlorsuccinimide and 105 ml. 1 N perchlorine acid. The reaction mixture was stirred for 4 hours at 30° C. under argon and worked up as described in Example XIV(a). The obtained 16α - methyl - 6α - fluor - 9α - chlor - Δ$^{1,4}$ - pregnadiene-11β,21-diol-3,20-dione-21-trimethylacetate was crystallized out of acetonehexane. Melting point 230.5–232° C. UV:ε$_{238}$=16,100. The yield amounted to 60% of theory.

EXAMPLE XXVIII

16α-methyl-6α-fluor-9α-chlor-Δ$^{1,4}$-pregnadiene-11β,21-diol-3,20-dione-21-butyrate (a) 10 g. 16α-methyl-6α-fluor-Δ$^{1,4}$-pregnadiene-11β,21-diol-3,20-dione-21-butyrate (M.P. 185–186° C. prepared from the 21-OH reaction product with butyric acid anhydride/pyridine, yield 94% of theory) were dissolved in 50 ml. dimethyl formamide and 8.8 ml. pyridine and then reacted with 4.4 ml. methane sulfonic acid chloride. The reaction and working up of the reaction product were carried out according to Example XV(a). The resulting 16α - methyl - 6α - fluor - Δ$^{1,4,9(11)}$ - pregnatriene - 21 - ol-3,20-dione butyrate was crystallized from isopropyl ether/methylene chloride. Melting point 131.5–132.5° C. The yield amounted to 80% of theory.

(b) 6.2 g. 16α-methyl-6α-fluor-Δ$^{1,4,9(11)}$-pregnatriene-21-ol-3,20-dione butyrate were dissolved in 325 ml. dioxane and reacted with 22 g. N-chlorsuccinimide and 163 ml. 1 N perchloric acid analogous to the procedure disclosed in Example 14(b). The 16α-methyl-6α-fluor-9α-chlor-Δ$^{1,4}$-pregnadiene - 11β,21 - diol-3,20-dione-21-butyrate which was thereby formed was crystallized from isopropylether/methylene chloride. Melting point 210–212°

C. (decomp.). UV: $\epsilon_{238}=16,000$. The yield amounted to 60% of theory.

EXAMPLE XXIX

16α-methyl-6α-fluor-Δ$^{1,4}$-pregnadiene-11β,21-diol-3,20-dione-21-caproate 10 g. 16α-methyl-6α-fluor-Δ$^{1,4}$-pregnadiene-11β,21-diol-3,20-dione in 40 ml. pyridine were allowed to stand with 20 ml. caproic acid anhydride for 12 hours at about 22° C. The caproate which crystallized out was separated by suction filtering, washed and dried and recrystallized from ethylene chloride. Melting point 242–245° C. UV: $\epsilon_{242}=16,200$. The yield amounted to 95% of theory.

EXAMPLE XXX

6α,9α-difluor-16α-methyl-1,4-pregnadiene-11β,21-diol-3,20-dione-21-undecylate 400 mg. 6α-9α-difluor-16α-methyl-1,4-pregnadiene-11β,21-diol-3,20-dione were introduced into a solution of 650 mg. undecylic acid anhydride in 3 ml. pyridine. The solution was allowed to stand for 48 hours at room temperature and thereafter reacted with about 5 ml. water and extracted with ether. The extract was washed with 2 N $H_2SO_4$, 2 N NaOH and with water. The washed extract was dried and then evaporated to dryness. The residue was washed with pentane and crystallized from isopropyl ether. Melting point 100/101–102° C. UV: $\epsilon_{236}=16,600$. The yield amounted to 369 mg.

EXAMPLE XXXI

6α-9α-difluor-16α-methyl-1,4-pregnadiene-11β,21-diol-3,20-dione-21-trimethylacetate 200 mg. 6α,9α-difluor-16α-methyl-1,4-pregnadiene-11β,21-diol-3,20-dione were dissolved in 2 ml. pyridine and reacted with 0.25 ml. trimethylacetic acid chloride. The solution was then allowed to stand at from 0 to 5° C. for 16 hours. Thereafter it was stirred for 2 hours at about 22° C. and then poured into ice water. After 30 minutes of stirring, the crystals which had separated out were removed by suction filtering and dissolved in acetic ester. The acetic ester solution was washed successively with 5% acetic acid, water, $NaHCO_3$ solution and water, dried over $Na_2SO_4$ and concentrated in vacuo. The concentrate was crystallized from isopropyl ether methylene chloride. Melting point 217/218–219° C. UV: $\epsilon_{239}=17,200$. The yield amounted to 185 mg.

EXAMPLE XXXII

16α-methyl-9α-fluor-1,4-pregnadiene-11β,21-diol-3,20-dione-21-trimethylacetate 2 g. 16α-methyl-9α-fluor-1,4-pregnadiene-11β,21-diol-3,20-dione in 10 ml. pyridine were reacted with 2.5 ml. pivalinic acid chloride as described in Example XVII. Melting point of the isolated 21-trimethylacetate 205.5–206.5° C. The yield amounted to 80% of theory.

EXAMPLE XXXIII

16α-methyl-6α-fluor-1,4-pregnadiene-11β,21-diol-3,20-dione-21-dimethylacetate 1 g. 16α-methyl-6α-fluor-1,4-pregnadiene-11β,21-diol-3,20-dione in 10 ml. pyridine were reacted with 1.2 ml. isobutyric acid chloride as described in Example XVII. Melting point of the isolated 21-dimethylacetate 187–188° C. UV: $\epsilon_{242}=15,900$. The yield amounted to 90% of theory.

EXAMPLE XXXIV

16α-methyl-6α-fluor-1,4-pregnadiene-11β,21-diol-3,20-dione-21-diethylacetate 1 g. 16α-methyl-6α-fluor-1,4-pregnadiene-11β,21-diol-3,20-dione in 5 ml. pyridine and 2.5 ml. diethylacetic acid anhydride were reacted for 20 hours at room temperature. Then the reaction mixture was worked up as described in Example XVII. Melting point of the isolated 21-diethylacetate 230–233° C. (crystallized out of ethylacetate). The yield amounted to 780 g.

EXAMPLE XXXV

16α-methyl-6α-fluor-1,4-pregnadiene-11β,21-diol-3,20-dione-21,2′,2′-dimethylbutyrate To a solution of 3 g. 16α-methyl-6α-fluor-1,4-pregnadiene-11β,21-diol-3,20-dione in 75 ml. pyridine were added 6 ml. 2,2-dimethylbutyric acid chloride at −5° C. The reaction mixture was stirred for 1 hours at +4 to 6° C. and thereafter worked up as described in Example XVII. Melting point of the isolated 21-2′,2′-dimethylbutyrate 161–163° C. UV: $\epsilon_{241}=15,000$. The yield amounted to 80% of theory.

EXAMPLE XXXVI

16α-methyl-6α,9α-difluor-1,4-pregnadiene-11β,21-diol-3,20-dione-21-caproate 1 g. 16α-methyl-6α,9α-difluor-1,4-pregnadiene-11β,21-diol-3,20-dione in 1 ml. pyridine and 2.5 ml. caproic acid anhydride were reacted for 4 hours at room temperature. Thereafter the reaction mixture was added into 10 ml. 8 volume percent sulfuric acid at 0° C. and stirred one hour. The 21-caproate which crystallized out was separated by suction filtering, washed and dried and recrystallized from ethylene chloride. Melting point 223–224° C. UV: $\epsilon_{128}=16,400$. The yield amounted to 950 mg.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

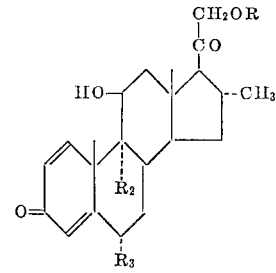

wherein R is acyl derived from a member selected from the group consisting of branched chain aliphatic carboxylic acids having at least four carbon atoms and straight chain aliphatic carboxylic acids having at least 6 carbon atoms in the acyl radical, $R_2$ is selected from the group consisting of hydrogen and halogen and $R_3$ is selected from the group consisting of hydrogen, halogen and methyl.

2. A therapeutic composition comprising an active anti-inflammatory agent and a pharmaceutically acceptable carrier therefor, the anti-inflammatory agent being constituted by a compound of the formula

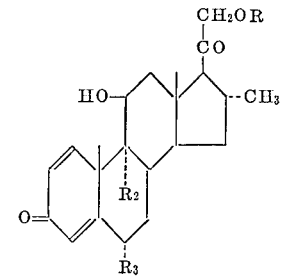

wherein R is acyl derived from a member selected from the group consisting of caproic, enanthic, undecylenic, palmitic, dimethyl acetic, trimethyl acetic, diethyl acetic, tert. butyl acetic, phenyl propionic and dimethyl butyric acid and wherein $R_2$ is selected from the group consisting of hydrogen, chlorine and fluorine and $R_3$ is selected from the group consisting of hydrogen and fluorine.

3. A method of treating inflammatory conditions comprising administering to a subject afflicted therewith a therapeutic composition comprising an active anti-inflammatory agent and a pharmaceutically acceptable carrier therefor, the said anti-inflammatory agent being constituted by a compound of the formula

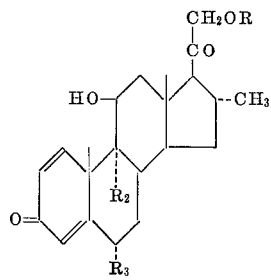

wherein R is acyl derived from a member selected from the group consisting of caproic, enanthic, undecylenic, palmitic, dimethyl acetic, trimethyl acetic, diethyl acetic, butyl acetic, phenyl propionic and dimethyl butyric acid and wherein $R_2$ is selected from the group consisting of hydrogen, chlorine and fluorine and $R_3$ is selected from the group consisting of hydrogen and fluorine.

4. 16α - methyl-6α-fluor-$\Delta^{1,4}$-pregnadiene-11β,21-diol-3,20-dione-21-enanthate.

5. 16α - methyl-6α-fluor-$\Delta^{1,4}$-pregnadiene-11β,21-diol-3,20-dione-21-trimethylacetate.

6. 16α - methyl-6α-fluor-$\Delta^{1,4}$-pregnadiene-11β,21-diol-3,20-dione-21-t.butylacetate.

7. 16α-methyl-6α-fluor-$\Delta^{1,4}$-pregnadiene - 11β,21 - diol-3,20-dione-21-phenylpropionate.

8. 16α-methyl-6α-fluor-$\Delta^{1,4}$-pregnadiene - 11β,21 - diol-3,20-dione-21-undecylate.

9. 16α-methyl-6α-fluor-$\Delta^{1,4}$-pregnadiene - 11β,21 - diol-3,20-dione-21-palmitate.

10. 16α - methyl - 6α - fluor-9α-chlor-$\Delta^{1,4}$-pregnadiene-11β,21-diol-3,20-dione-21-undecylate.

11. 6α-9α-difluor - 16α - methyl-1,4-pregnadiene-11β,21-diol-3,20-dione-21-enanthate.

12. 16α - methyl - 6α - fluor-9α-chlor-$\Delta^{1,4}$-pregnadiene-11β,21-diol-3,20-dione-21-caproate.

13. 16α - methyl - 6α - fluor-9α-chlor-$\Delta^{1,4}$-pregnadiene-11β,21-diol-3,20-dione-21-butylacetate.

14. 16α - methyl - 6α - fluor-9α-chlor-$\Delta^{1,4}$-pregnadiene-11β,21-diol-3,20-dione-21-trimethylacetate.

15. 16α - methyl - 6α - fluor-$\Delta^{1,4}$-pregnadiene-11β,21-diol-3,20-dione-21-caproate.

16. 6α-9α - difluor - 16α - methyl-1,4-pregnadiene-11β,21-diol-3,20-dione-21-undecylate.

17. 6α-9α - difluor - 16α - methyl-1,4-pregnadiene-11β,21-diol-3,20-dione-21-trimethylacetate.

18. A therapeutic composition comprising as active anti-inflammatory agent a compound according to claim 1 and comprising a pharmaceutically acceptable carrier.

19. A method of treating inflammatory conditions comprising administering to a subject afflicted therewith a therapeutic composition comprising as active anti-inflammatory agent a compound according to claim 1 in dosage unit form together with a pharmaceutically acceptable carrier.

20. 16α - methyl-9α-fluor-1,4-pregnadiene-11β,21-diol-3,20-dione-21-trimethylacetate.

21. 16α - methyl-6α-fluor-1,4-pregnadiene-11β,21-diol-3,20-dione-21-dimethylacetate.

22. 16α - methyl-6α-fluor-1,4-pregnadiene-11β,21-diol-3,20-dione-21-diethylacetate.

23. 16α - methyl-6α-fluor-1,4-pregnadiene-11β,21-diol-3,20-dione-21-2',2'-dimethylbutyrate.

24. 16α - methyl - 6α,9α - difluor-1,4-pregnadiene-11β,21-diol-3,20-dione-21-caproate.

References Cited

UNITED STATES PATENTS 3,232,839  2/1966  Kieslich et al. _____ 167—77

HENRY A. FRENCH, *Primary Examiner.*

U.S. Cl. X.R.

260—239.55, 397.45, 397.47